United States Patent [19]

Mihm et al.

[11] Patent Number: 5,121,941
[45] Date of Patent: Jun. 16, 1992

[54] AIR BAG MODULE

[75] Inventors: Joseph J. Mihm, North Branch; Patrick G. Jarboe, Shelby Township; Steven R. Hoskins, Washington; James R. Hocking, Sterling Hts., all of Mich.

[73] Assignee: TRW Vehicle Safety Systems Inc., Cleveland, Ohio

[21] Appl. No.: 657,423

[22] Filed: Feb. 19, 1991

[51] Int. Cl.5 .............................................. B60R 21/16
[52] U.S. Cl. ...................................... 280/732; 280/743
[58] Field of Search ............... 280/728, 730, 731, 732, 280/738, 743

[56] References Cited

U.S. PATENT DOCUMENTS

| | | | |
|---|---|---|---|
| 3,514,124 | 5/1970 | Richardson | 280/732 |
| 3,588,142 | 6/1971 | Gorman | 280/736 |
| 3,637,110 | 1/1972 | Cirillo et al. | 222/3 |
| 3,761,111 | 9/1973 | Kemper | 280/729 |
| 3,794,346 | 2/1974 | Brockman et al. | 280/740 |
| 3,797,854 | 3/1974 | Poole et al. | 280/741 |
| 3,801,126 | 4/1974 | Knight, IV et al. | 280/732 |
| 3,817,552 | 6/1974 | Knight, IV et al. | 280/732 |
| 3,819,205 | 6/1974 | Dunford et al. | 280/731 |
| 3,827,715 | 8/1974 | Lynch | 280/731 |
| 3,871,684 | 3/1975 | Staudacher et al. | 280/741 |
| 3,880,447 | 4/1975 | Thorn et al. | 280/740 |
| 3,910,595 | 10/1975 | Katter et al. | 280/732 |
| 4,013,010 | 3/1977 | Schneiter et al. | 102/531 |
| 4,043,572 | 8/1977 | Hattori et al. | 280/738 |
| 4,066,415 | 1/1978 | Kasama et al. | 422/165 |
| 4,167,276 | 9/1979 | Bell et al. | 280/731 |
| 4,191,392 | 3/1980 | Barnett | 280/740 |
| 4,275,901 | 6/1981 | Okada | 280/741 |
| 4,325,568 | 4/1982 | Clark et al. | 280/731 |
| 4,332,398 | 6/1982 | Smith | 280/732 |
| 4,530,516 | 7/1985 | Adams et al. | 280/741 |
| 4,806,180 | 2/1989 | Goetz et al. | 149/5 |
| 4,830,401 | 5/1989 | Honda | 280/736 |
| 4,852,907 | 8/1989 | Shiraki et al. | 280/731 |
| 4,911,471 | 3/1990 | Hirabayashi | 280/732 |
| 4,915,410 | 4/1990 | Bachelder | 280/732 |
| 4,934,735 | 6/1990 | Embach | 280/735 |
| 4,938,500 | 7/1990 | Nakazato et al. | 280/731 |
| 4,938,504 | 7/1990 | Fukuda et al. | 280/731 |
| 4,964,654 | 10/1990 | Bishop et al. | 280/743 |

FOREIGN PATENT DOCUMENTS

| | | |
|---|---|---|
| 0357225 | 3/1990 | European Pat. Off. . |
| 2503447 | 8/1975 | Fed. Rep. of Germany ...... 280/732 |
| 58-1180339 | of 1983 | Japan . |

*Primary Examiner*—Kenneth R. Rice
*Attorney, Agent, or Firm*—Calfee Halter & Griswold

[57] ABSTRACT

A new and useful vehicle air bag module design and new assembly techniques are designed specifically for automating the process of assembling an air bag module. The air bag module includes a reaction can which has a main body defining a cavity and an air bag opening, an external flange extending away from the air bag opening, and an inflator-receiving slot formed in part of the main body. A folded air bag having a gas inlet opening is at least partially disposed in the cavity. A retention device is integral with the air bag around the periphery of the gas inlet opening and is disposed adjacent the external flange on the reaction can. The inflator has a cylindrical housing and an integral coupling structure. The cylindrical housing extends partially through the inflator-receiving slot and includes a portion disposed within said cavity and a portion disposed outside said cavity. A first set of fasteners connects the coupling structure of the inflator with a portion of said main body of said reaction can. A second set of fasteners connects the retention device with the external flange on the reaction can. The reaction can, which may be either aluminum or steel, is formed as a monolithic structure by deep drawing techniques.

35 Claims, 6 Drawing Sheets

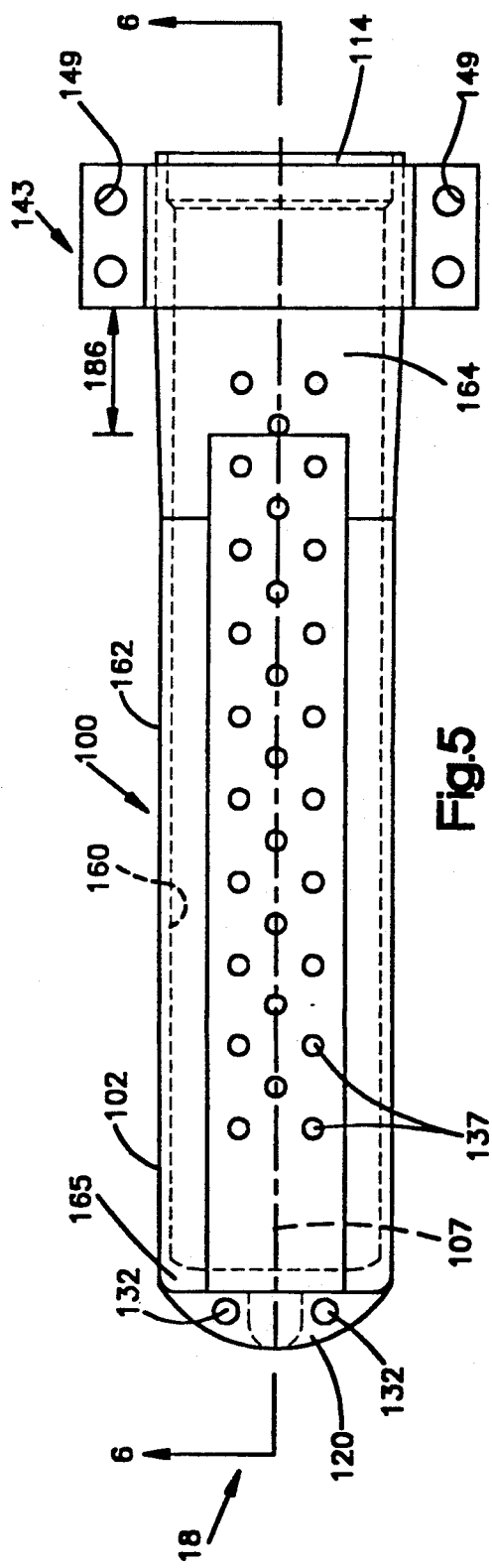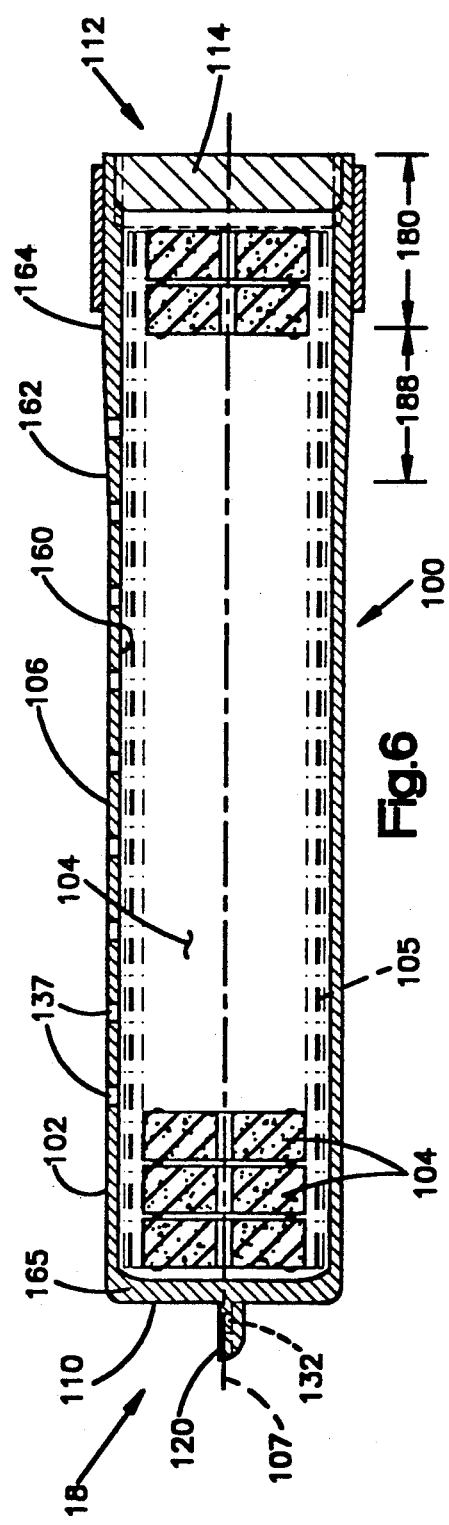

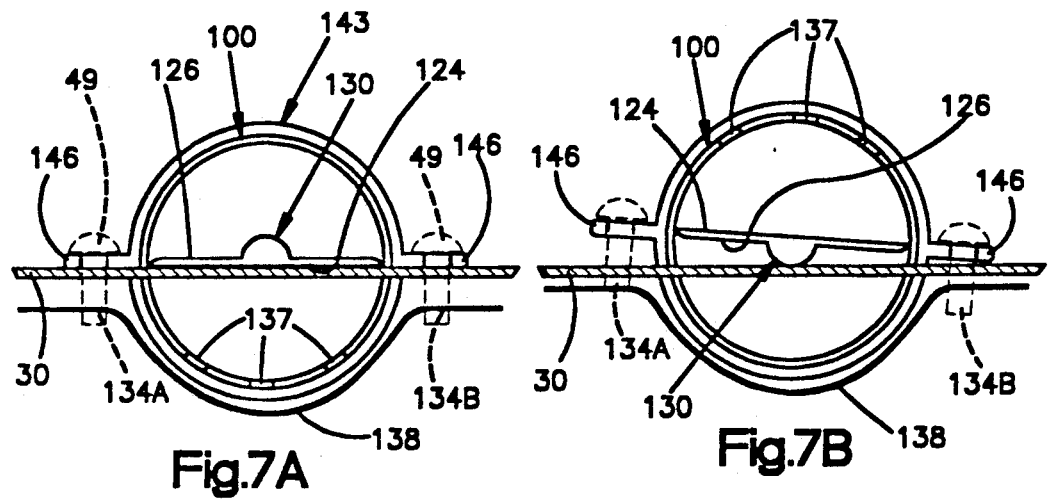
Fig.7A  Fig.7B
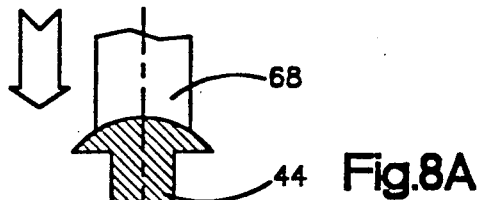
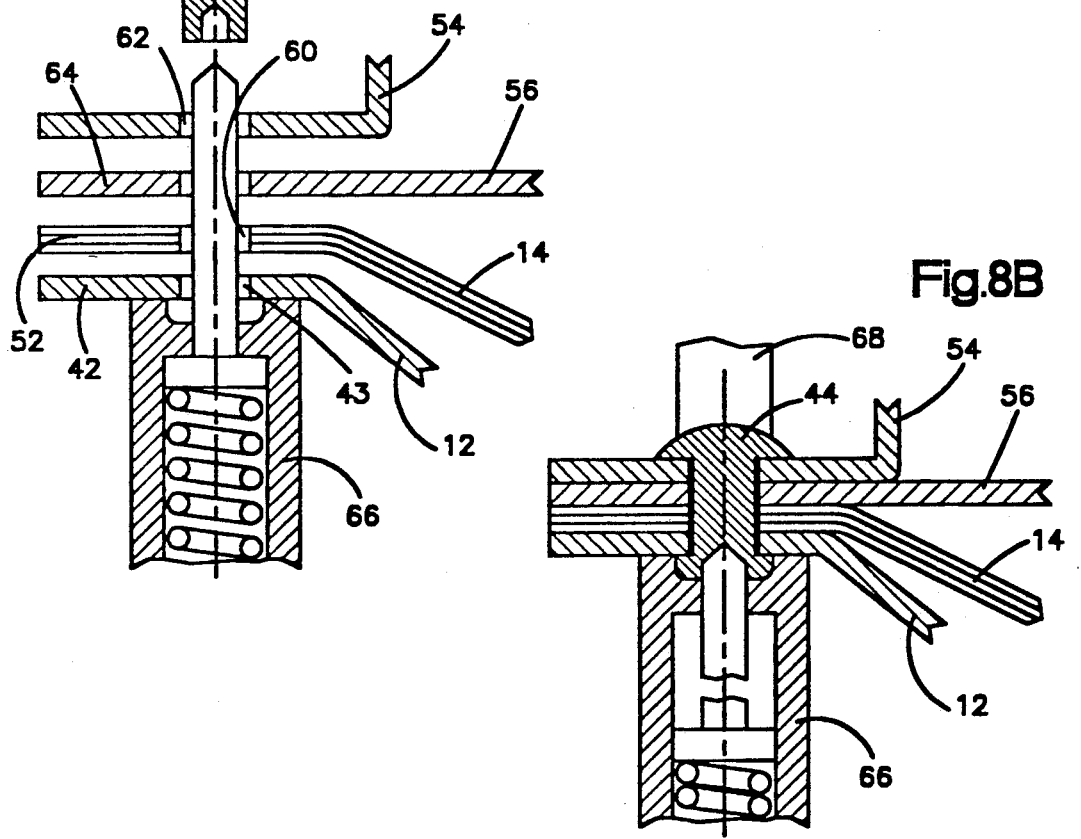
Fig.8A  Fig.8B

AIR BAG MODULE

FIELD OF THE INVENTION

This invention relates generally to an air bag module comprising a reaction can, a folded air bag disposed within the reaction can, and a cylindrical inflator disposed partially in the reaction can.

BACKGROUND OF THE INVENTION

A vehicle air bag module is a complete air bag unit which is assembled apart from the vehicle and then coupled as a unit with the vehicle. Typically, an air bag module includes (i) a reaction device, (ii) a folded air bag connected to the reaction device, (iii) an inflator, or gas generator, connected to the reaction device, and (iv) a cover connected to the reaction device to complete an enclosure for the folded air bag. The module is generally coupled with a structural part of the vehicle via the reaction device. In the case of a passenger side air bag module, for example the reaction device may be coupled with the support structure for the vehicle dashboard, and the cover of the module may form a part of the dashboard. Alternatively, in the case of a driver side air bag module, the reaction device may be coupled with the steering wheel support structure, and the cover of the module may form a part of the steering wheel cover.

When coupled with a vehicle, an air bag module operates to deploy an air bag at the onset of a vehicle collision. Specifically, at the onset of a collision, large quantities of gas under relatively high pressure are discharged from the inflator as a result of the ignition of a gas-generating chemical mixture in the inflator and/or the release of gas stored under pressure in the inflator. The cover is designed so that when such gas is discharged from the inflator, portions of the cover can separate to create a deployment opening for the air bag. The gas simultaneously (i) forces the air bag through the deployment opening in the cover and (ii) inflates the air bag. As the air bag is being deployed and inflated, relatively high forces are applied to the various components of the air bag module. The reaction device transmits such forces to the vehicle structure from the air bag module during deployment of the air bag.

In the air bag industry, new and more cost-effective techniques for forming air bag modules are becoming increasingly important. Air bag modules are currently being installed in a large number of automobiles. The number of air bag modules installed in the future will continue to increase, as consumer demand and federal regulatory requirements for vehicle safety also continue to increase. To enable auto makers to meet this growing demand, there is a continuing need for simple and effective techniques which lend themselves to mass production and preferably automation, of air bag modules.

In many existing air bag modules, the reaction device forms a receptacle with a cavity for storing the air bag prior to deployment. This type of reaction device is commonly called a "reaction can". In applicants' experience, a reaction can is usually formed by bolting, riveting or welding together several components. While such "multi-piece" reaction cans have proven satisfactory, they sometimes are not particularly suited for automated assembly. More specifically, in order to automate the assembly of a multi-piece reaction can, it would be necessary to automate the steps of aligning or positioning the various components in their correct orientations and the steps of bolting, riveting or welding these aligned components to each other.

Additionally, in many known air bag module designs, the manner in which the air bag is attached to the reaction can presents further problems in terms of automating the production of such modules. For example, in the interest of minimizing the overall size of an air bag module, it is well known to rivet the mouth of the air bag to the inside surface of the reaction device. However, this fastening technique requires the use of blind rivets which may complicate automated assembly and which present problems in inspecting the quality of the rivets in an efficient manner. Additionally, such a technique requires the rivets to be driven from a variety of directions, which further complicates automated assembly.

Still another issue which affects automated assembly of air bag modules is the attachment of the inflator to the reaction can. Many air bag modules are designed to include an inflator which is commonly referred to as "cylindrical" (i.e., an inflator having an axial length larger than its diameter). These cylindrical inflators present their own problems in regard to automation of the assembly of air bag modules. For example, it is well known to load a cylindrical inflator axially into a reaction can through a wall of the can. Such axial loading is usually difficult to accomplish by automation, especially with live inflators.

In addition to the inflator attachment being incompatible with automated assembly, the subsequent positioning of the inflator within the reaction can may also conflict with the general industry recognized desire to minimize the overall size of an air bag module. More particularly, in many air bag module designs, the cylindrical inflator is disposed completely within the reaction can, and thus occupies a significant portion of the air bag cavity. Additionally, in many applications, assembly tolerances and techniques result in an "thermal insulation barrier" or an empty space between the inflator and the rear portion of the reaction can. Thus, in some air bag module designs, the reaction can must be large enough to accommodate the entire cylindrical inflator and house at least a portion of the folded air bag.

Many existing air bag module designs make it difficult to incorporate lightweight materials (e.g., aluminum) in both the reaction can and the housing of the inflator. This difficulty is the result of the thermal insulation barrier delaying the transmission of ambient heat to the inflator. The delay may retard the onset of auto ignition of the gas generating chemical mixture in the inflator, thereby making it more difficult for an aluminum reaction can, for example, to withstand the temperatures required to initiate auto ignition during a "bonfire" test.

These and other concerns have affected and continue to affect the design of air bag modules. For example, a more recent approach to the assembly of a cylindrical inflator with an air bag module is disclosed in U.S. Pat. No. 4,915,410 to Bachelder. In Bachelder, a cylindrical inflator is "back loaded" into a module after the air bag has been preassembled into the module. The cylindrical inflator is inserted into and aligned in a cradle formed in a reaction plate. A spring clip is then attached to the reaction plate to maintain the cylindrical inflator in the cradle. In order to automate assembly of such a module, it would appear to be necessary first to align the inflator in the cradle, and then attach the spring clip to the reaction plate.

Two other concepts for facilitating the assembly of air bag modules are disclosed in two co-pending applications assigned to the assignee of the present application, namely Ser. No. 07/539,023 to Paquette et al., filed Jun. 15, 1990 and Ser. No. 07/493,962 to Augustitus et. al., filed Mar. 15, 1990. In each of these two applications, an air bag/cover subassembly and a reaction device/inflator subassembly are separately formed and subsequently are connected to each other to complete the air bag module.

Despite such advances in the design of air bag modules, applicants believe a continuing need exists for air bag module structures and assembly techniques which (i) minimize the components required to construct the modules, (ii) minimize the weight and size of individual module components, (iii) reduce the costs and simplify the techniques for manufacturing such individual components, and (iv) simplify the techniques for assembling the modules.

SUMMARY OF THE INVENTION

The present invention provides a new and useful air bag module structure, new assembly techniques for assembling the module, and certain new and useful components for such a module. The structure, components and techniques of the invention are designed specifically for automating the process of assembling an air bag module, and are believed to allow efficient (and possibly automated) inspection of the modules during assembly. Moreover, the structure, components, and techniques of the invention are designed to produce a module which can be made of light weight components which are simple and efficient to form and to assemble with each other in forming the module.

The present invention is particularly adapted for an air bag module which incorporates a reaction can having a cavity and an air bag opening. According to the present invention, the reaction can is a monolithic structure having an external flange disposed about the air bag opening and a rear slot. The slot enables a portion of a cylindrical inflator to extend partially into the cavity of the reaction can, with the remainder of the inflator extending outside of the reaction can. The design of the reaction can permits and facilitates its formation. Specifically, because the reaction can is a monolithic structure, the aligning/coupling assembly steps necessary to form conventional multi-piece reaction cans are eliminated. Additionally, by using deep drawing techniques, the formation of the reaction can may be efficiently automated.

The external flange of the reaction can is adapted to be coupled to an air bag, which is disposed in the reaction can, and to a cover, which overlies the external flange, by a set of fasteners. This coupling technique allows the fasteners to be strong substantially solid rivets, rather than the blind rivets conventionally employed. In addition, both ends of each rivet are visible for easy inspection after the attachment of the air bag and cover.

In the preferred embodiment, all portions of the external flange are co-planar. The co-planar positioning allows the "driving direction" of all of the rivets to be the same. Thus, there is no need to adjust the driving direction of the riveting tool during the assembly process as may be necessary when, for instance, the air bag is secured to inner surfaces of a reaction can.

Additionally, in the preferred embodiment, the external flange extends around the entire periphery of the air bag opening. This reinforces the reaction can around the opening. Such reinforcement is particularly important to prevent "fish-mouthing" of the reaction can during deployment of the air bag. Such fish-mouthing is particularly likely to occur if the reaction can is made of aluminum.

A further feature of the air bag module according to the present invention which permits, or facilitates, automatic assembly is the inflator-receiving slot provided in a rear portion of the reaction can. This slot is designed to enable the inflator to be connected to the reaction can either by front loading or back loading techniques. The available space within the reaction can is efficiently used because the inflator extends only partially through the slot and thus only takes up a selected part of the space. The folded air bag can then substantially fill the remaining space within the cavity. The efficient use of space in the reaction can may allow the reduction of the overall size of the reaction can. Further, the inflator positioning in the reaction can makes it possible to have a light-weight reaction can/inflator combination that can pass a bonfire test. More specifically, applicants believe that the air bag module of the present design would be able to survive the bonfire test or other auto-ignition situations even if both the reaction can and the inflator are made of aluminum. Because there is no "dead space" forming a thermal insulation barrier between the back of the reaction can and the inflator, the ambient heat will directly contact the inflator.

The present invention departs in some ways from conventional air bag assembly techniques by locating a flange external to the reaction can and attaching the fasteners external to the module. This location of the "coupling" device is known to increase the overall size of the air bag module and, therefore, has traditionally been undesirable. Nonetheless, the other features of the invention, for example, the inflator-receiving slot and the positioning of the inflator with the reaction can, utilize available space in an efficient manner to reduce the overall size of the reaction can.

The present invention particularly provides a vehicle air bag module comprising a reaction can, a folded air bag, a retention device, and an inflator. The reaction can is a monolithic structure which includes a main body defining a cavity and an air bag opening, and an external flange extending away from the air bag opening. The folded air bag has a gas inlet opening and is at least partially disposed in the cavity. The main body comprises a pair of converging wall sections and an inflator-receiving slot is formed in one of these wall sections. The external flange extends completely around the air bag opening and has outer surface portions which are co-planar relative to each other.

The inflator comprises a cylindrical housing and a coupling structure integral with the housing. The cylindrical housing extends partially through the inflator-receiving slot and includes a portion disposed within the cavity and a portion disposed outside the cavity. Gas dispensing nozzles are formed in the portion of the cylindrical housing disposed within the cavity. The portion of the cylindrical inflator housing disposed within the air bag cavity occupies a predetermined portion of the volume space in the air bag cavity and the folded air bag fills substantially all remaining portions of the volume space in the air bag cavity. A first set of fasteners connect the coupling structure of the inflator with a portion of the main body of the reaction can.

The air bag module further comprises a cover including a portion designed to overlie the external flange on the reaction can. A retention device, which is integral with the air bag, extends around the periphery of the gas inlet opening and is disposed adjacent the external flange on the reaction can or, more particularly, against the outer surface portions of the flange. A second set of fasteners connect the retention device with the external flange on the reaction can and also connect the cover to the external flange on the reaction can. Each of the fasteners in the second set of fasteners has opposite ends, and the opposite ends are disposed external to the air bag, the cover, and the reaction can. In this manner, the opposite ends of each of the second set of fasteners may be inspected from outside of the vehicle air bag module.

These and other features of the invention are fully described below.

BRIEF DESCRIPTION OF THE DRAWINGS

In the annexed drawings

FIG. 5 is a top plan view of the housing of the inflator used in the air bag modules shown in FIGS. 1-4;

FIG. 6 is a sectional view of the inflator housing structure taken substantially along the plane described by the lines 6—6 of FIG. 5;

FIG. 7A is an end view of the inflator housing structure of FIGS. 5-6 illustrating proper alignment of the tongue with a wall of the reaction can;

FIG. 7B is an end view of the inflator housing structure of FIGS. 5-6 illustrating misalignment of the tongue with a wall of the reaction can; and FIGS. 8A and 8B illustrate typical assembly steps in the assembly of the air bag module.

DETAILED DESCRIPTION

Figure 1:
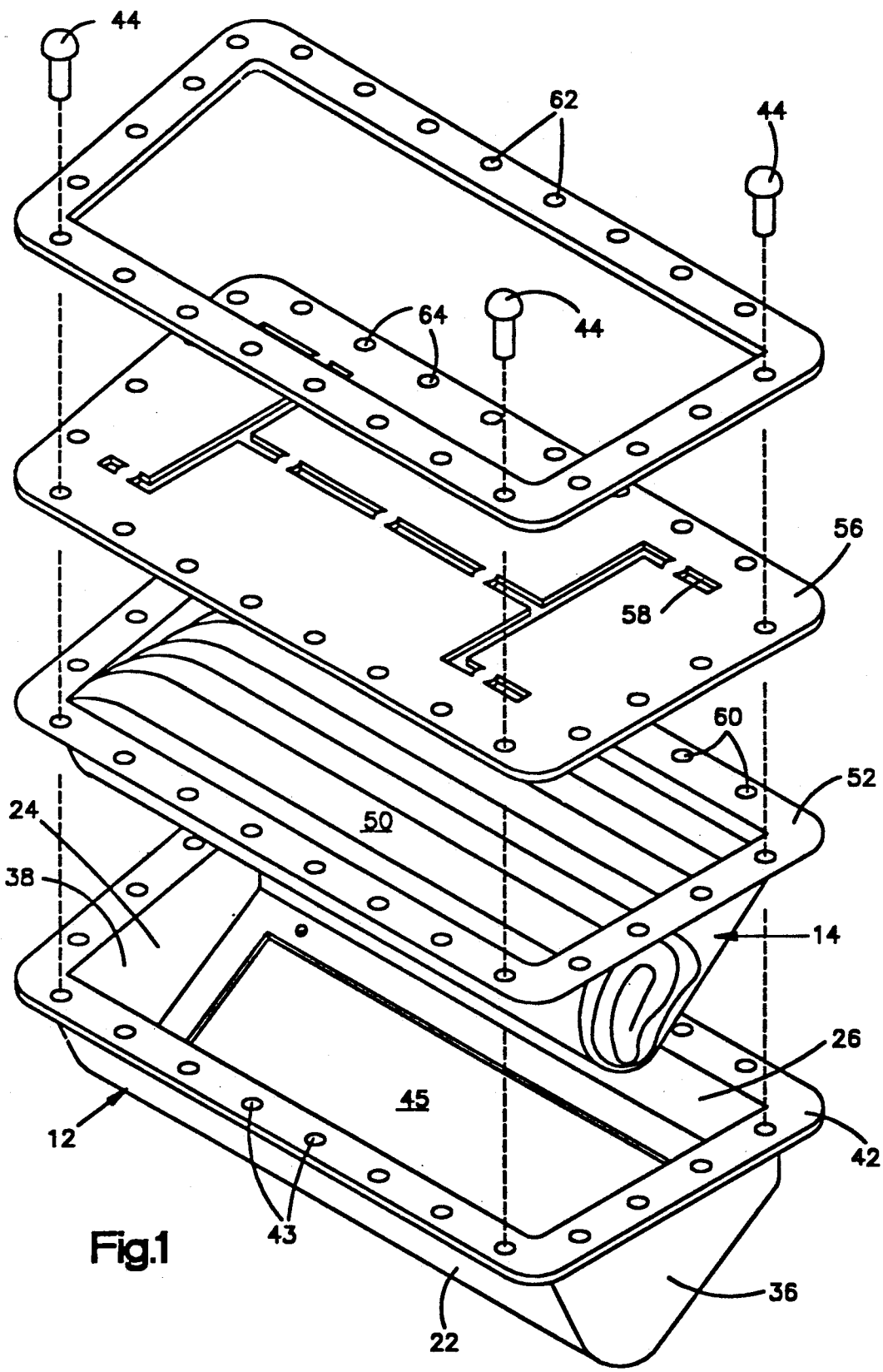
FIG. 1 is an exploded perspective view of a certain components of an air bag module according to the preferred embodiment of the present invention.
Figure 2:
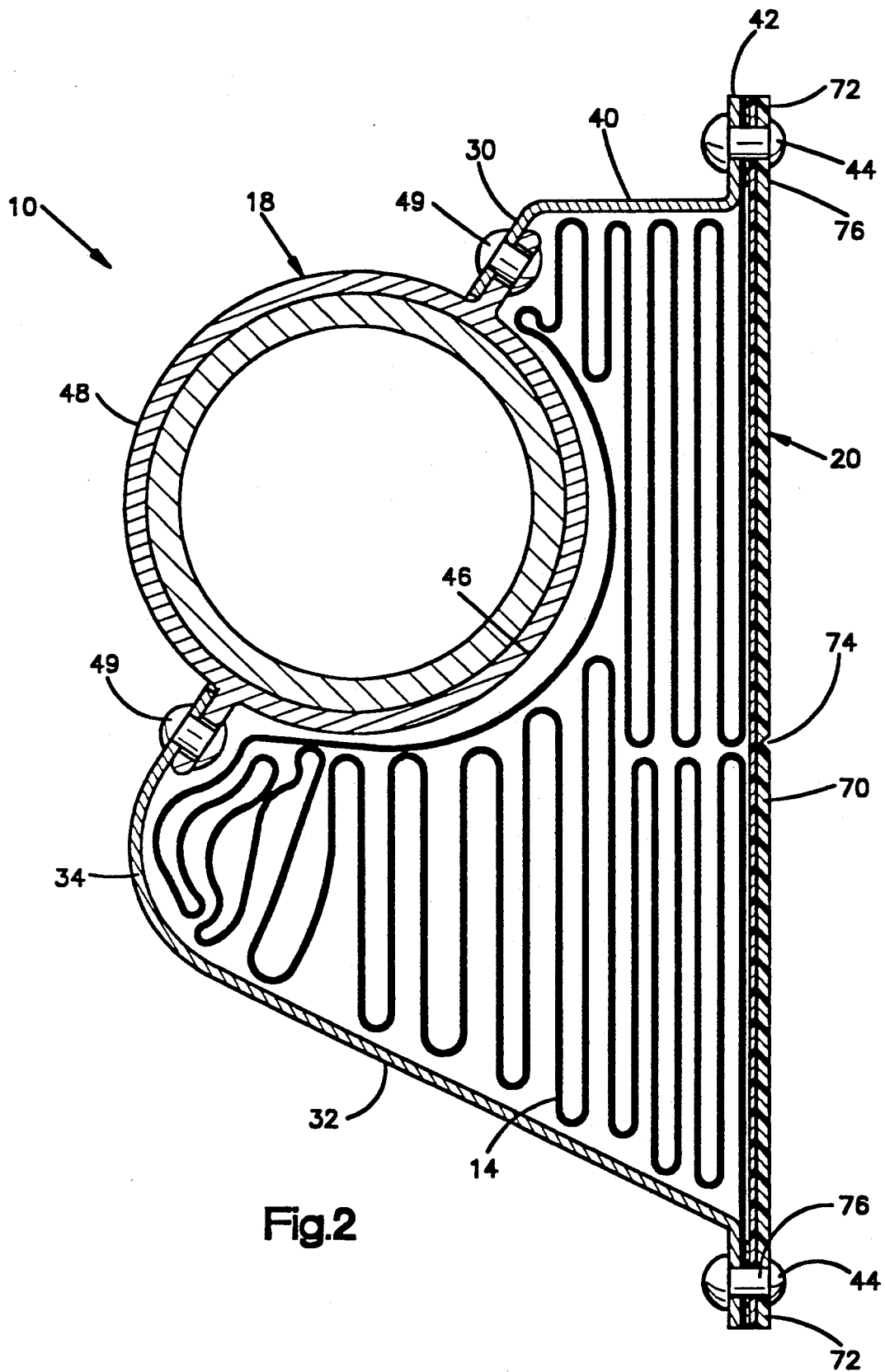
FIG. 2 is a side sectional view of the air bag module according to the present invention.

Referring now to the drawings in detail, and initially to FIGS. 1 and 2, an air bag module 10 according to the preferred embodiment of the present invention is shown. The air bag module 10 includes a reaction can 12, a folded air bag 14, an inflator 18, and a cover 20. The reaction can 12 is made of a material which is able to transmit air bag deployment forces to the vehicle structure from the air bag module 10 during deployment of the air bag 14. In the preferred embodiment, the reaction can 12 is made of either steel or aluminum and is formed as a monolithic structure by deep drawing techniques. The reaction can 12 may also be a monolithic structure made of a suitable nonmetallic material, such as vinyl-ester or a structural reaction injection molding compound. "Monolithic" in this context refers to structure cast as a single piece or composed of a material without joints or seams. By forming the reaction can 12 as a monolithic structure, the assembly steps entailing the coupling together of components necessary when forming conventional multi-piece reaction cans are eliminated. Additionally, by using deep drawing techniques, the formation of the reaction can may be efficiently automated. In the preferred embodiment, the monolithic structure is at least partially cold worked which allows the formation of rounded, rather than sharp, corners at various junctions of the reaction can. The reaction can 12 includes a main body portion 22 defining an air bag cavity 24 and a front air bag opening 26. The portion of the main body portion 22 that defines the front air bag opening 26 is rectangular in plan so that the opening spans substantially the length and width of the reaction can 12. In section, as is best seen in FIG. 2, the main body portion is roughly triangular, and the folded air bag 16 is substantially enclosed in the main body portion 22.

The main body portion 22 of the reaction can 12 is formed by a pair of converging wall sections 30 and 32, which join at a rounded corner 34, and a pair of end panels 34 and 36 (FIG. 1). The converging wall sections 30 and 32 account for the roughly triangular sectional shape of the main body portion 22 and the air bag cavity 24 defined by the main body portion. The end panels 36 and 38 are correspondingly roughly triangular in shape. The converging wall sections 30 and 32 are preferably of different dimensions, or depths, when measured from the front opening 26 toward the corner 34. The different dimensions provide an asymmetrical shape which is believed to be a space efficient design when used in some vehicles. While the wall sections 30 and 32 are substantially linear in cross-section, a third wall section 40 extends angularly from the distal end of the converging wall section 30 in the preferred embodiment.

The reaction can 12 also includes an external flange 42 extending around the periphery of the rectangular air bag opening 24. The flange 42 is connected to the outer edges of the wall section 40, the converging wall section 32, and the end panels 36 and 38. The flange 42 includes co-planar surface portions, which, in the illustrated embodiment, extend completely around the air bag opening 26. The flange 42 serves as a coupling component of the reaction can 12. To this end, the flange 42 includes openings 43.

The openings 43 in the flange 42 accommodate fasteners 44 to connect the folded air bag 14 and the cover 20 to the reaction can 12. This particular attachment arrangement allows the fasteners 44 to be substantially solid rivets, as opposed to blind rivets commonly used, thereby allowing efficient, automated attachment of the air bag 14 to the reaction can 12. Additionally, as is best seen in FIG. 2, both ends of the installed fasteners are visible, which permits convenient and accurate inspection of the attachment. Further, because the major surfaces of the flange 42 are co-planar, all of the fasteners 44 are oriented in a common direction and the driving direction of the riveting tool may remain constant throughout this assembly step.

Beside serving as a coupling component for the reaction can 12, the peripheral flange 42 also provides structural reinforcement for the reaction can. More particularly, during the deployment of an air bag, the mouth of a reaction can, which in this case surrounds the air bag opening 26, is usually subjected to significant reaction forces. Without adequate reinforcement, certain portions of the reaction can mouth are known to deform or "fish-mouth" during deployment. The flange 42 provides reinforcement against such "fish-mouthing", which is particularly important if the reaction can 12 is made of aluminum.

The reaction can 12 further includes an inflator-receiving slot 45 located in the converging wall section 30. The illustrated inflator 18, which will be described in greater detail below, is cylindrical in shape. The slot 45 is rectangular in shape and has a length and width which are preferably about equal to the length and outer diameter of the inflator 18. The converging wall 30 is preferably longer and wider than the slot 45 so that it includes substantially planar portions on either radial side of the installed inflator 18, and a substantially planar portion on at least one axial end of the installed inflator 18.

When the inflator 18 is received in the slot 45 (i.e., loaded in the reaction can 12), it extends partially through the slot 45. In this manner, a front semi-cylindrical portion 46 of the inflator 18 is disposed within the air bag cavity 24. The remaining rear semi-cylindrical portion 48 is disposed outside of the air bag cavity 24. In the preferred embodiment, the front portion 46 will constitute roughly half of the inflator 18. In a reaction can of this type where the air bag 14 is stored almost totally within the reaction can, the overall size, or volume. of the reaction can is dictated by the space required to hold the folded air bag. Use of the slot 45 ensures that only a portion of the inflator 18 occupies the air bag cavity 24, thereby minimizing the spaced required in the cavity in addition to the space occupied by the folded air bag 14. The slot 45 may be easily included in the initial fabrication of the reaction can, although it may also be stamped at a later stage of the fabrication.

In the preferred embodiment shown in FIGS. 1 and 2, the inflator 18 is front loaded into the reaction can 12. The coupling structure of the inflator 18, which is described in more detail below, is secured to interior surfaces of the converging wall 30 adjacent the slot 45 by fasteners 49. Such "front-loading" of the inflator helps the reaction can absorb the reaction forces created during deployment of the air bag 14. More specifically, as the inflation gas is discharged from the inflator 18 towards the air bag 14 and cover 20, a reaction force is generated in the opposite, rearward direction. As is best seen in FIG. 2, such a rearward force would drive the coupling components of the inflator against the reaction can. The reaction can 12 can thus take up the rearward reaction force and maintain the integrity of the air bag module 10 even if the fasteners 49 fail. Still further, the fasteners 49 may be oriented in a common direction, thereby increasing the efficiency of the inflator/reaction can attachment step.

Figure 4:
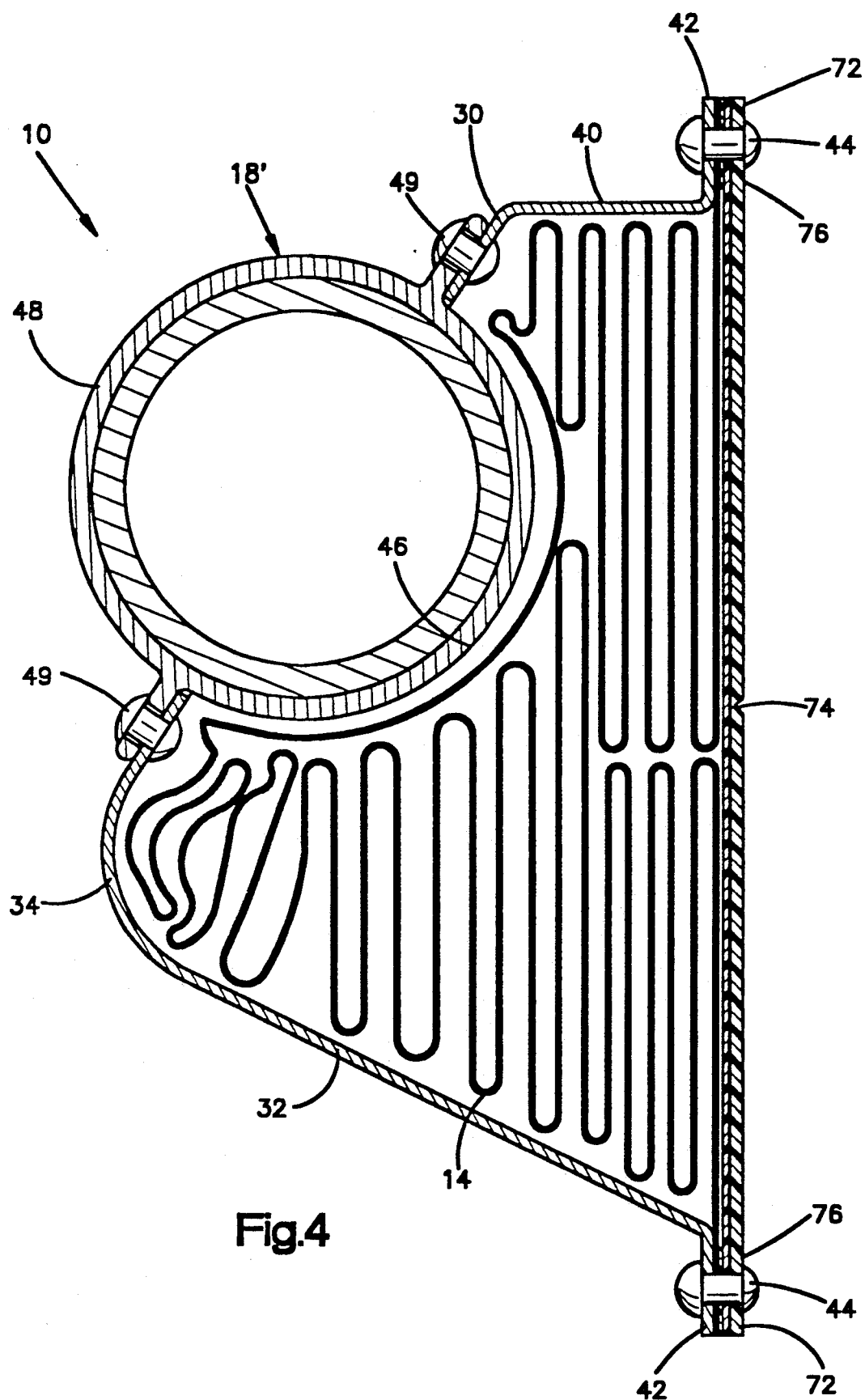
FIG. 4 is a side sectional view of the air bag module of FIG. 1 except with the inflator being back loaded into the reaction can.

While the inflator 18 is preferably front-loaded, it can also be back-loaded as shown in FIG. 4. When the inflator 18 is back loaded into the reaction can 12, the coupling components of the inflator 18 are secured to exterior surfaces of the converging wall 30 adjacent the inflator-receiving slot 45. Back-loading allows the shipment of an inflator separate from the remaining portions of an air bag module.

Turning now to the air bag 14, it can be made of a porous woven fabric or of an impermeable material, such as a rubber-coated fabric or a plastic film. The air bag 14 is preferably folded to fit entirely within the air bag cavity 24 of the reaction can 12. Because the air bag 14 is to some degree deformable, its folded shape prior to installation need not exactly match the inner contour of the reaction can 12. However, the geometry of the folded air bag 14 is preferably roughly triangular in section so that it may be easily disposed in the air bag cavity 24. The air bag 14 includes a gas inlet opening 50, through which gas discharged by the inflator 18 passes during deployment of the air bag 14. When the air bag 14 is installed in the reaction can 12, the gas inlet opening 50 coincides with the front air bag opening 26.

To attach the air bag 14 to the reaction can 12, the air bag module 10 includes a retention device 52, which is integral with the air bag 14, and a separate retaining rim 54. The retention device 52 may be, for example, an extension of the air bag material itself which is stiffened by a coating of rubber or plastic. Alternatively, the retention device 52 could consist of a rigid frame sewn into edge portions of the air bag 14. The retaining rim 54 is preferably made of a metal, such as aluminum or steel, but may also be made of a high strength plastic.

The retention device 52 extends around the periphery of the gas inlet opening 50 and has the same general configuration as the external flange 42 of the reaction can 12. The retention device 52 will thus fit neatly against the external flange 42 of the reaction can 12. The retaining rim 54 has also the same general configuration as the external flange 42. The retaining rim 54 is designed for placement on a side of the retention device 52 opposite the external flange 42. In other words, in the assembled air bag module 10, the retention device 52 will be sandwiched between the external flange 42 and the retaining rim 54.

Although not necessary, a shipping door 56 may be placed between the retention device 52 and the retaining rim 54. While not needed as a functional part of the air bag module, a shipping door 56 may be desirable to keep the air bag 14 intact in its folded shape during pre-assembly shipping and/or before the cover 20 is coupled to the reaction can 12. (The shipping door shown in FIG. 1 is not included in the assembled air bag module shown in FIGS. 2–4.) As shown in FIG. 1, the shipping door 56 is basically rectangular in shape and dimensioned so that its outer edges coincide with the outer edges of the retention device 52 and retaining rim 54. The door 56 may be made of any suitable material, such as a thin sheet of plastic, and includes score lines 58 which will burst during deployment of the air bag module 10.

To permit their attachment to the reaction can 12, the retention device 52, the retaining rim 54 and the shipping door 56 include openings 60, 62 and 64, respectively. These openings are positioned to align with the openings 43 in the reaction can flange 42 so that the foregoing components may be fixed to the reaction can 12 by the fasteners 44. Typical assembly steps are shown in FIGS. 8A and 8B in which a riveting tool including a spring biased aligning member 66 and a driving member 68 is shown.

If a shipping door 56 is used, the cover 20 is attached to the reaction can 20 after the subassembly shown in FIG. 1 is shipped to an automobile manufacturer. If no shipping door 56 is used, the cover 20 will be attached to the reaction can 12 at the same time as the retention device 52 and the retaining rim 54. In a passenger side air bag system, the cover 20 forms part of the vehicle dashboard which faces the passenger compartment of the vehicle. In a driver side system, the cover 20 forms part of the steering wheel. In either event, the cover 20 is preferably made of a tough and relatively flexible plastic having impact resistance properties such as a plastic manufactured and sold by General Electric Company of Schenectady, N.Y., under the tradename "Ultem."

The cover 20 includes a planar central portion 70 and a border portion 72 surrounding the central portion. The central portion 70 is substantially rectangular and covers the front air bag opening 26 in the reaction can 12. The central portion 70 also includes slotted and/or scored sections 74 to enable the cover 20 to separate to create a deployment opening for the air bag 14. The border portion 72 of the cover 20 also includes openings 76 which are positioned to align with the openings 43 in the reaction can flange 42. The openings 76 permit the cover 20 to be coupled to the reaction can in the same assembly step as the retention device 52 and the retaining rim 54.

The inflator 18 is also fixed to the reaction can 12. FIGS. 5 and 6 illustrate the preferred form of such an inflator. The illustrated inflator is the subject of another patent application, assigned to the assignee of the present invention, which will be filed shortly hereafter. This patent application is entitled "Air Bag Inflator and Method of Assembly" and the inventors are Patrick G. Jarboe, Steven W. Maurer, and Joseph J. Mihm.

The inflator 18 includes an inflator housing, indicated generally at 100, which comprises a cylindrical container 102 defining a cavity 103. The container 102 holds solid gas generating material (shown schematically at 104 in FIG. 6), and a filter structure (shown schematically at 105 in FIG. 6). The cylindrical container 102 includes a tubular main wall 106 which circumscribes a longitudinal axis 107 and which is substantially longer than its diameter. An end wall 110 is located at one longitudinal end of, and formed in one piece with, the main wall 106. The other longitudinal end of the main wall 106 defines an opening, indicated generally at 112, which is closed by an end cap 114.

The inflator 18 includes a tongue 120 extending from, and formed in one piece with, the wall 110. The tongue 120 forms part of the preferred form of the inflator coupling structure. Additionally, the tongue 120 is used to locate and align the inflator 100 within the reaction can 12 of the air bag module 10. The tongue 120 has an asymmetrical geometric contour in profile. More particularly, the tongue 120 includes a substantially planar top surface 124, a generally parallel bottom surface 126, and a "misalignment" feature, indicated generally at 130. The misalignment feature 130 comprises a contoured surface having a substantially semi-circular cross-sectional profile which extends downwardly from the bottom surface 126 of the tongue 120.

As shown most clearly in FIG. 5, the tongue 120 includes attachment apertures 132, e.g., bolt or rivet holes, which enable the inflator 100 to be coupled to the reaction can 12 of the air bag module 10. The fasteners 49 are inserted through the apertures 132 and apertures (unnumbered) in the wall 30 to couple the tongue 120 to the reaction can 12.

When the inflator 18 is correctly oriented relative to the reaction can 12, as shown in FIG. 7A, gas dispensing nozzles 137 in the main wall 106 are directed inwardly into the reaction can 12 to inflate the air bag 14. Additionally, the surface 124 of the tongue 120 lies substantially flat against the wall 30 of the reaction can 12 and the fasteners 49 are properly seated. If the inflator 188 is improperly oriented with the air bag module 10, as shown in FIG. 7B, then the misalignment feature 130 will effectively indicate a misalignment. More particularly, the misalignment feature 130 on the bottom surface 126 of the tongue 120 will create a separation between the tongue 120 and the wall 30 of the reaction can 12 when coupling is attempted. Such a misalignment can be discovered promptly and efficiently either by visual or automated inspection processes.

The inflator housing structure also includes a sleeve, indicated generally at 143 which, along with the tongue 120, forms the inflator coupling structure in the preferred embodiment. The sleeve 143 comprises a tubular section and is adapted to be attached to the inflator housing 100, as illustrated in FIG. 5, proximate the open end 112 of the inflator housing. The sleeve 143 can be attached to the inflator housing 100 by a variety of attachment techniques such as, for example, press fitting or shrink fitting. Another possible attachment technique is a tongue and key arrangement in which the inside surface of the sleeve 143 has a longitudinally extending tongue adapted to be received in a longitudinally extending groove formed in the container 102.

The sleeve 143 includes a pair of diametrically opposed and outwardly projecting flanges 146 which each include a top surface and a bottom surface. The sleeve 143 is attached to the inflator housing 100 such that top surface 147 of each flange 146 extends outwardly along the same plane as the top surface 124 of tongue 120. As shown in FIG. 5, each flange includes attachment apertures 149, e.g., bolt or rivet holes, for receiving the fasteners 49.

Figure 3:
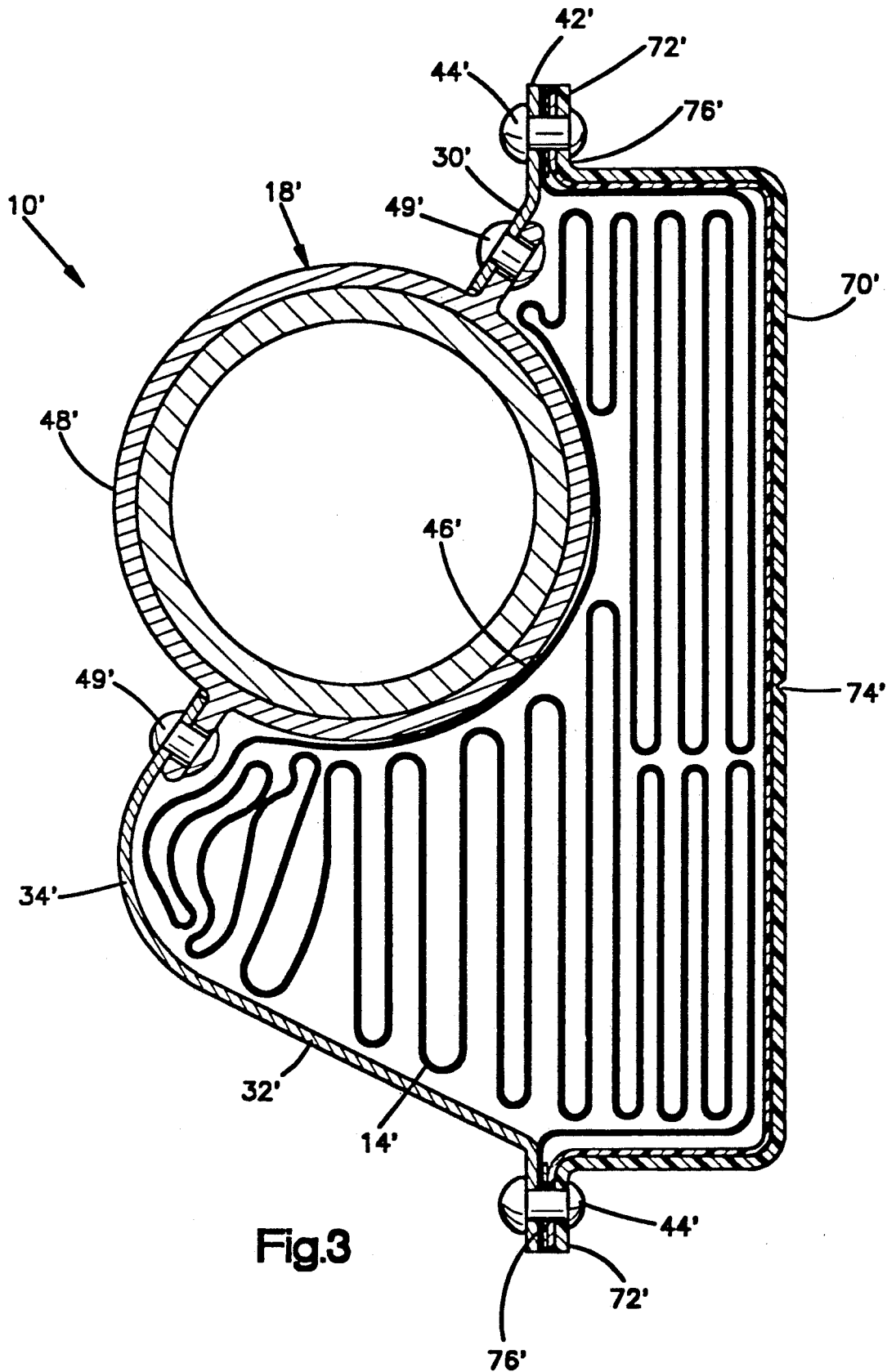
FIG. 3 is a side sectional view of an air bag module according to another embodiment of the present invention.

Another embodiment of an air bag module 10' is shown in FIG. 3. This embodiment includes many components similar or identical to the air module 10 described above and thus like reference numerals, with a prime suffix (') are used to denote these components. However, in this embodiment, the reaction can 12' does not include a third wall portion 40 extending from the distal edge of the converging wall 30'. Thus, the flange 42' is connected to the outer edges of the converging wall section 30', the converging wall section 32', and the end panels 36' and 38' (end panels 36' and 38' are not specifically shown).

Additionally, the cover 20' is of a somewhat different configuration than the cover 20 of air bag module 10. More specifically, the central portion 70', instead of being substantially planar, is cup-shaped. Along with the reaction can 12', the central portion 70' houses the air bag 14'. However, the border portion 72, of the cover 20' is of substantially the same configuration as the border portion 72' and includes openings 76' which are positioned to align with the openings 44' in the reaction can flange 42'.

One may now appreciate that an air bag module according to the present invention allows the attachment of an air bag to a reaction can with substantially solid rivets thereby allowing automated assembly, and allowing the convenient inspection of such assembly. Additionally, the described positioning of an inflator in the reaction 12 results in the efficient use of available space. Still further, a reaction can according to the present invention allows the fabrication of this component itself to be efficiently automated.

Although the invention has been shown and described with respect to certain preferred embodiments, it is obvious that equivalent alterations and modifications will occur to others skilled in the art upon the reading and understanding of this specification. The present invention includes all such equivalent alterations and modifications and is limited only by the scope of the following claims.

What is claimed is:

1. A vehicle air bag module comprising:
a reaction can including a main body defining a cavity and an air bag opening, an external flange extending away from said air bag opening, and an inflator-receiving slot formed in part of said main body;
a folded air bag having a gas inlet opening and being at least partially disposed in said cavity;
a retention device integral with said air bag around the periphery of said gas inlet opening and disposed adjacent said external flange on said reaction can;
an inflator comprising a cylindrical housing and a coupling structure integral with the housing, said cylindrical housing extending partially through said inflator-receiving slot and including a portion disposed within said cavity and a portion disposed outside said cavity, gas dispensing nozzles being formed in said portion of said cylindrical housing disposed within said cavity;
a first set of fasteners connecting said coupling structure of said inflator with a portion of said main body of said reaction can; and
a second set of fasteners connecting said retention device with said external flange on said reaction can.

2. A vehicle air bag module as set forth in claim 1 further comprising a cover, said cover including a portion designed to overlie said external flange on said reaction can, said second set of fasteners connecting said cover to said external flange on said reaction can.

3. A vehicle air bag module as set forth in claim 2 wherein each of the fasteners in said second set of fasteners has opposite ends, said opposite ends being disposed external to said air bag, said cover, and said reaction can, whereby said opposite ends of each of said second set of fasteners may be inspected from outside of said vehicle air bag module.

4. A vehicle air bag module as set forth in claim 1 wherein said external flange has outer surface portions against which said retention device is disposed, said outer surface portions being co-planar relative to each other.

5. A vehicle air bag module as set forth in claim 1 wherein said external flange extends completely around said air bag opening.

6. A vehicle air bag module as set forth in claim 1 wherein said portion of said cylindrical inflator housing disposed within said air bag cavity occupies a predetermined portion of the volume space in said air bag cavity and said folded air bag fills substantially all remaining portions of the volume space in said air bag cavity.

7. A vehicle air bag module as set forth in claim 1 wherein said folded air bag occupies an envelope of predetermined geometric proportion and said retention device extends away from said envelope.

8. A vehicle air bag module as set forth in claim 1 wherein all of the fasteners of said first set of fasteners are oriented in a common direction to each other and wherein all of the fasteners of said second set of fasteners are oriented in a common direction to each other.

9. A vehicle air bag module as set forth in claim 8 wherein said main body of said reaction can comprises a wall with an inside surface defining said cavity and an outside surface on the opposite side of said wall from said inside surface, said inflator coupling structure comprising at least one flange integral with said cylindrical housing, said flange being disposed in a predetermined orientation against a portion of said wall, and said first set of fasteners extending through said flange and said portion of said wall to connect said cylindrical inflator housing to said portion of said wall.

10. A vehicle air bag as set forth in claim 9 wherein said flange is disposed against the inside surface of said portion of said wall.

11. A vehicle air bag as set forth in claim 9 wherein said flange is disposed against the outside surface of said portion of said wall.

12. A vehicle air bag as set forth in any of claims 1-11 wherein said reaction can consists essentially of a monolithic structure.

13. A vehicle air bag module comprising:
a reaction can including (a) a main body defining a cavity and an air bag opening and (b) an external flange extending away from said air bag opening, said main body comprising a pair of converging wall sections and having an inflator-receiving slot formed in one of said pair of converging wall sections;
a folded air bag having a gas inlet opening, said folded air bag being attached to said reaction can and disposed at least partially within said cavity;
an inflator comprising a cylindrical housing and a coupling structure integral with the housing, said cylindrical housing extending partially through said slot in said main body and including a portion disposed within said cavity and a portion disposed outside said cavity, gas dispensing nozzles being formed in said portion of said cylindrical housing disposed within said cavity; and
a first set of fasteners connecting said inflator coupling structure with said main body of said reaction can.

14. A vehicle air bag module as defined in claim 13 wherein said converging wall sections are of different dimensions whereby said main body is asymmetrical in shape.

15. A vehicle air bag module as set forth in either of claims 13 or 14 further comprising a retention device integral with said air bag around the periphery of said gas inlet opening and disposed adjacent said external flange on said reaction can; and a second set of fasteners connecting said retention device with said external flange on said reaction can.

16. A vehicle air bag module as set forth in claim 15 further comprising a cover, said cover including a portion designed to overlie said external flange on said reaction can, said first set of fasteners connecting said cover to said external flange on said reaction can.

17. A vehicle air bag module as set forth in claim 16 wherein each of the fasteners in said second set of fasteners has opposite ends, said opposite ends being disposed external to said air bag, said cover, and said reaction can, whereby said opposite ends of each of said second set of fasteners may be inspected from outside of said vehicle air bag module.

18. A vehicle air bag module as set forth in claim 17 wherein said external flange has outer surface portions against which said retention device is disposed, said outer surface portions being co-planar relative to each other.

19. A vehicle air bag module as set forth in claim 18 wherein said external flange extends completely around said air bag opening.

20. A vehicle air bag module as set forth in claim 19 wherein said portion of said cylindrical inflator housing disposed within said air bag cavity occupies a predetermined portion of the volume space in said air bag cavity and said folded air bag fills substantially all remaining portions of the volume space in said air bag cavity.

21. A vehicle air bag module as set forth in claim 20 wherein said folded air bag occupies an envelope of predetermined geometric proportion and said retention device extends away from said envelope.

22. A vehicle air bag module as set forth in claim 21 wherein all of the fasteners of said first set of fasteners are oriented in a common direction to each other and wherein all of the fasteners of said second set of fasteners are oriented in a common direction to each other.

23. A vehicle air bag module as set forth in claim 22 wherein said main body of said reaction can comprises a wall with an inside surface defining said cavity and an outside surface on the opposite side of said wall from said inside surface, said inflator coupling structure comprising at least one flange integral with said cylindrical housing, said flange being disposed in a predetermined orientation against a portion of said wall, and said first set of fasteners extending through said flange and said portion of said wall to connect said cylindrical inflator housing to said portion of said wall.

24. A vehicle air bag as set forth in claim 23 wherein said flange is disposed against the inside surface of said portion of said wall.

25. A vehicle air bag as set forth in claim 23 wherein said flange is disposed against the outside surface of said portion of said wall.

26. A vehicle air bag as set forth in any of claims 13-25 wherein said reaction can consists essentially of a monolithic structure.

27. A reaction can for a vehicle air bag module, said reaction can comprising:
   a monolithic structure defining a cavity and an air bag opening;
   said monolithic structure including a main body portion and an external substantially planar flange circumscribing said air bag opening and extending away from said air bag opening;
   said main body portion of the monolithic structure extending away from said flange and defining the cavity;
   said main body portion having a slot shaped to enable a cylindrical inflator to extend partially through said slot whereby the cylindrical inflator will be disposed partially in said air bag cavity and partially outside said air bag cavity.

28. A reaction can as set forth in claim 27 wherein said monolithic structure is at least partially cold worked.

29. A reaction can as set forth in claim 27 wherein said monolithic structure is made of aluminum.

30. A reaction can as set forth in claim 27 wherein said monolithic structure is made of steel.

31. A reaction can as set forth in claim 27 wherein said main body portion comprises a pair of converging wall sections.

32. A reaction can as set forth in claim 31 wherein said converging wall sections are of different dimensions whereby said main body portion is asymmetrical in shape.

33. A reaction can as set forth in claim 27 wherein said monolithic structure is made of a nonmetallic material.

34. A vehicle air bag module comprising:
   a reaction can including a main body defining a cavity and an air bag opening, an external flange extending away from said air bag opening, and an inflator-receiving slot formed in part of said main body;
   a folded air bag having a gas inlet opening and being at least partially disposed in said cavity;
   a retention device integral with said air bag around the periphery of said gas inlet opening and disposed adjacent said external flange on said reaction can;
   an inflator comprising a cylindrical housing and a coupling structure which couples said housing to said reaction can, said cylindrical housing extending partially through said inflator-receiving slot and including a portion disposed within said cavity and a portion disposed outside said cavity, gas dispensing nozzles being formed in said portion of said cylindrical housing disposed within said cavity;
   a first set of fasteners connecting said coupling structure of said inflator with a portion of said main body of said reaction can; and
   a second set of fasteners connecting said retention device with said external flange on said reaction can.

35. A vehicle air bag module comprising:
   a reaction can including (a) a main body defining a cavity and an air bag opening and (b) an external flange extending away from said air bag opening, said main body comprising a pair of converging wall sections and having an inflator-receiving slot formed in one of said pair of converging wall sections;
   a folded air bag having a gas inlet opening, said folded air bag being attached to said reaction can and disposed at least partially within said cavity;
   an inflator comprising a cylindrical housing an a coupling structure which couples said housing to said reaction can, said cylindrical housing extending partially through said slot in said main body and including a portion disposed within said cavity and a portion disposed outside said cavity, gas dispensing nozzles being formed in said portion of said cylindrical housing disposed within said cavity; and
   a first set of fasteners connecting said inflator coupling structure with said main body of said reaction can.

* * * * *